United States Patent
Grimm

(10) Patent No.: US 7,797,108 B2
(45) Date of Patent: Sep. 14, 2010

(54) COLLISION AVOIDANCE SYSTEM AND METHOD OF AIDING REARWARD VEHICULAR MOTION

(75) Inventor: Donald K. Grimm, Utica, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 936 days.

(21) Appl. No.: 11/550,820

(22) Filed: Oct. 19, 2006

(65) Prior Publication Data

US 2008/0097700 A1     Apr. 24, 2008

(51) Int. Cl.
     *G08G 1/16*         (2006.01)

(52) U.S. Cl. .................. 701/301; 701/300; 701/302; 340/901; 340/902; 340/903; 340/435

(58) Field of Classification Search .............. 701/96, 701/117, 207, 208, 213, 216, 223, 301, 302; 340/901, 902, 903, 988, 995.1, 995.12, 435, 340/436; 342/357.06, 357.07, 357.08, 357.09, 342/357.13
See application file for complete search history.

(56) References Cited

U.S. PATENT DOCUMENTS

| | | | | |
|---|---|---|---|---|
| 5,959,552 A | * | 9/1999 | Cho | 340/903 |
| 5,983,161 A | * | 11/1999 | Lemelson et al. | 701/301 |
| 6,408,237 B1 | * | 6/2002 | Cho | 701/45 |
| RE38,870 E | * | 11/2005 | Hall | 701/301 |
| 2002/0036584 A1 | * | 3/2002 | Jocoy et al. | 342/70 |
| 2003/0098786 A1 | * | 5/2003 | Bishop | 340/435 |
| 2003/0141965 A1 | * | 7/2003 | Gunderson et al. | 340/431 |
| 2004/0178926 A1 | * | 9/2004 | Lee et al. | 340/904 |
| 2006/0052933 A1 | * | 3/2006 | Ota | 701/200 |

OTHER PUBLICATIONS

Wiesenfelder, The Lexus LS460: It Really Does Park Itself, Sep. 22, 2006, Kicking Tires of Cars.com, http://blogs.cars.com/kickingtires/2006/09/ls_460_parking.html.*

Cameron, Collision Detection by Four-Dimensional Intersection Testing, Jun. 3, 1990, IEEE Transactions on Robotics and Automation, vol. 6 No. 3, pp. 291-302.*

* cited by examiner

*Primary Examiner*—Khoi Tran
*Assistant Examiner*—Spencer Patton

(57) ABSTRACT

A collision avoidance system adapted for use with a rearward traveling host vehicle, and by an operator, in a preferred embodiment includes an object locator sub-system configured to determine at least one condition for a plurality of objects, wherein the objects include infrastructure, appurtenances, and remotely traveling equipped vehicles, and pedestrians, a intra-vehicle condition sensor, and a control unit configured to assess collision threats based on the object and host vehicle condition data, and alert the operator or autonomously cause a braking mechanism to be actuated, when a collision is determined.

11 Claims, 3 Drawing Sheets

COLLISION AVOIDANCE SYSTEM AND METHOD OF AIDING REARWARD VEHICULAR MOTION

BACKGROUND OF THE INVENTION

1. Technical Field

The present invention relates to collision avoidance systems adapted for use with vehicles, and more particularly to an multi-modular system configured to accurately detect potential collisions with various types of objects.

2. Discussion of Prior Art

Collision avoidance systems can be categorized within one of a plurality of classes, and may be sensory, global-positioning-system (GPS), or vehicle-to-vehicle communication based. Sensory-based systems employ exterior sensors to detect objects. Once detected the system alerts the operator typically through visual, or audio means. These systems, however, generally only provide short-range detection and are limited to line-of-sight applications. Next, GPS technology is commonly utilized to manage vehicular traffic upon thoroughfares. This technology, however, requires the detected vehicle to also include GPS technology and to communicate its positional data to the host vehicle or to a third party intermediary, and therefore, does not detect non-equipped vehicles. Finally, direct inter-vehicular communication systems among vehicles have also been developed in vehicle-to-vehicle (V2V) enabled environments. Like GPS, they require complex implementation.

Though effective in their intended purpose, all of these systems generally do not provide a wide range of object detection. Further, these systems are typically configured for forward implementation, and are not tailored to detect objects during rearward maneuvers.

SUMMARY OF THE INVENTION

A collision avoidance system and method of detecting an object by a host vehicle is described herein. The present invention is useful, among other things, for providing a comprehensive system capable of detecting a plurality of types of objects, and as a result, for improving the confidence, security, and overall driving experience of the operator. Further, the present invention is useful for providing a method of effecting collision avoidance by autonomously actuating a braking mechanism.

A first aspect of the present invention concerns a collision avoidance system adapted for use with a rearward traveling host vehicle and by an operator. The system comprises an object detection sub-system configured to detect at least one condition of each of a plurality of arrear objects, and generate an input signal, when the vehicle is traveling in a rearward direction, and an object is detected. The system also includes an intra-vehicle condition sensor configured to determine at least one condition of the host vehicle, and at least one electronic control unit communicatively coupled to the sub-system and sensor. The unit is configured to cause to be generated a warning, wherein the warning is perceivable by the operator, when at least one condition of one of the plurality of arrear objects and at least one condition of the host vehicle cooperatively determine a potential collision.

A second aspect of the present invention concerns a method of preventing a rearward traveling host vehicle and object collision. The method includes the steps of autonomously determining host vehicle data, including the current position, heading, speed and gearshift position of the host vehicle, and condition information, including the current position coordinates, of a plurality of objects, when the gearshift is in the reverse position. The objects include infrastructure, appurtenances, and vehicles and pedestrians equipped with position data transmitters. The method further includes the steps of autonomously assessing the threat of collision between the host vehicle and each of said objects based on the condition information and host vehicle data, and autonomously causing a host vehicle braking mechanism to actuate when a threat of collision is determined.

The present invention provides a number of enhancements over the prior art, including, for example, providing a more comprehensive collision avoidance system capable of detecting a wider range of objects, and a more efficient method of threat assessment. Further, this invention extends V2V and infrastructure-to-vehicle (I2V) communication based collision avoidance systems that have been demonstrated so far primarily in the forward direction of the vehicle.

Other aspects and advantages of the present invention will be apparent from the following detailed description of the preferred embodiment(s) and the accompanying drawing figures.

BRIEF DESCRIPTION OF DRAWINGS

Preferred embodiments of the invention are described in detail below with reference to the attached drawing figures, wherein.

DETAILED DESCRIPTION OF THE INVENTION

Figure 1:
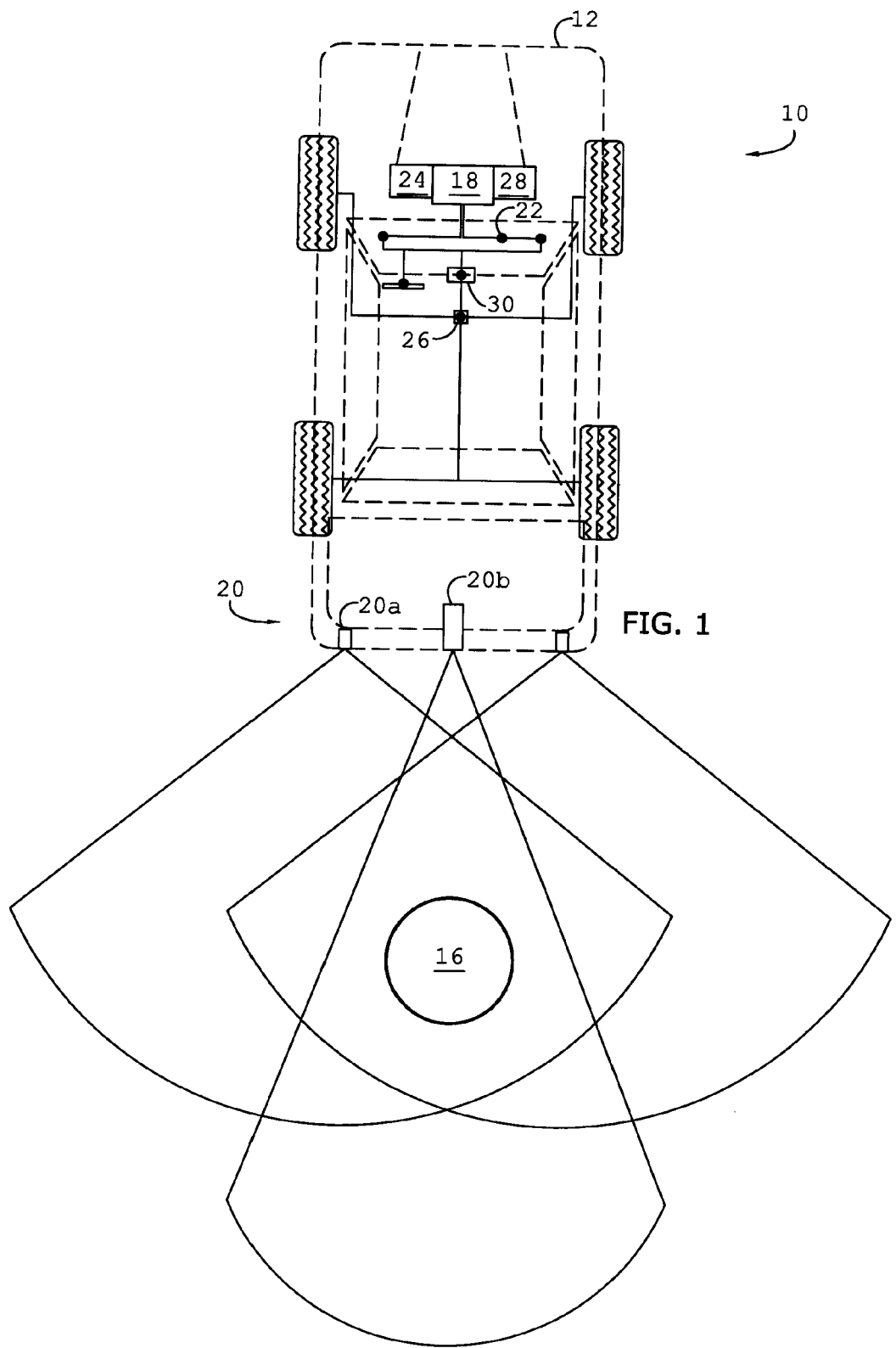
FIG. 1 is a plan view of a host vehicle, and at least one object, in accordance with a preferred embodiment of the present invention, particularly illustrating the range and orientation of the preferred host vehicle object detection sub-system.

As best shown in FIG. 1, the present invention concerns a backing warning system 10 adapted for use with a host vehicle 12, and by an operator 14. The system 10 is configured to identify and warn the operator 14 of moving or stationary objects 16 in the proximity of the vehicle 12, preferably only when the vehicle 12 is performing a rearward maneuver, such as those encountered while parallel parking an automobile. The preferred system 10 is configured to detect a wide variety of objects 16, including other vehicles, pedestrians, animals, infrastructure, and appurtenances, and as such, preferably consists of multiple modules, where each module applies to a particular type of object.

The modules are further described herein, with the understanding that any of the modules may be fragmented into a further or combined into a lesser number of modules. It is appreciated that the modules are intended to be executed by at least one electronic control unit (ECU) or control unit 18 that is programmably configured in accordance therewith. As such, the host vehicle 12 includes suitable software and storage functionality as is sufficient to effect the intended purposes of the invention.

Generally, the collision avoidance system 10 includes an object detection sub-system 20 configured to detect at least one condition of each of a plurality of arrear objects 16 within its range or communication zone, and generate an input signal, when the vehicle 12 is traveling in a rearward direction, and an object 16 is detected. The system 10 also includes an intra-vehicle condition sensor 22 configured to determine at least one condition of the target vehicle, such as the position, speed, yaw rate, heading, and/or gearshift position of the vehicle 12.

The system 10 can be standalone V2V, or an autonomous sensor system that is enhanced by V2V. The ECU 18 is communicatively coupled to the sub-system 20 and sensor 22, and configured to cause to be generated a warning perceivable by the operator 14, when at least one condition of one of the plurality of arrear objects 16 and at least one condition of the host vehicle 12 cooperatively determine a potential collision. In a preferred embodiment, the sensor 22 and sub-system 20 cooperatively include a host vehicle position coordinate locator, such as a conventional GPS receiver. As typical, the locator and communication device are configured to receive position coordinate data from the objects 16, and transmit the data to the unit 18. Where the objects 16 include remotely traveling vehicles, the host vehicle 12 further includes a V2V communication device 24. Finally, in a preferred embodiment the ECU 18 is communicatively coupled and configured to actuate a braking mechanism 26 of the host vehicle 12, so that when a potential collision is determined the vehicle 12 is caused to change speeds and/or stop.

1. Vehicle to Vehicle/Object Cross Path Backing Warning

More particularly, a Cross Path Backing Warning (CPBW) module warns the operator 14 when there is an approaching object 16, such as a traveling remote vehicle, whose path may intersect with the host vehicle 12. This application will classify neighboring objects 16 based on their positions and headings ($h_o$), and will identify intersecting objects as those having headings greater than a minimum threshold degree, $Heading_{min}$, and less than a maximum threshold degree, $Heading_{max}$, relative to the heading of the host vehicle ($h_{hv}$). In the illustrated embodiment, preferred values for $Heading_{min}$ and $Heading_{max}$ are 30 degrees and 150 degrees, and more preferably 45 degrees, and 120 degrees respectively, although it is appreciated that these values can be adjusted up or down as required.

As shown in FIG. 1, and applicable to all modules, the objects are detected utilizing an object detection sub-system 20 that includes rearwardly oriented detection or sensing devices. The sub-system 20 preferably includes at least one short-range sensor 20a, and a long-range sensor 20b. For cross path backing warning, sensory devices should be mounted on the rear quarter panel and look outward from the sides of the vehicle 12. It is appreciated that in the slower speeds typically encountered in reverse short and long ranges may vary from their typical definitions. For example, short-range sensors are preferably operable to detect objects within 3 meters, and long-range sensors are preferably operable to detect objects within a 10 meter radius. The sub-system 20 may utilize one or a combination of various technologies to provide redundancy and complimentary capabilities, such as a radar, lidar, infrared, or vision/camera based technology.

Figure 1A:
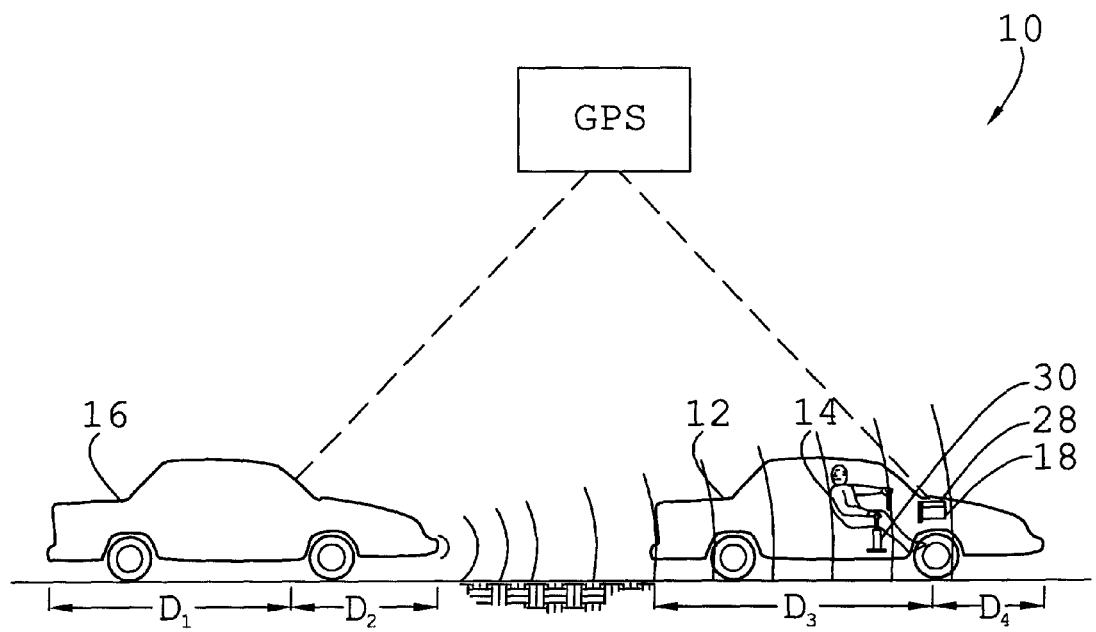
FIG. 1a is an elevation view of a host vehicle and at least one object, in accordance with a preferred embodiment of the present invention, particularly illustrating a GPS based object-detection sub-system, and an object broadcasting within a communication zone.

More preferably, in this module, the sub-system 20 further presents a much longer range of operation by utilizing GPS 20c, and a V2V (or V2-object) communication device 24, as shown in FIG. 1a GPS/V2V communication does not require line-of-sight in order to track oncoming threat vehicles. Information from sensory devices can be combined with information from vehicle-to-vehicle communication to improve feature performance, i.e., sensory devices can make use of advance information that will improve the time it takes to acquire and classify threat objects. Certain information from V2V is also of higher quality than can be obtained from sensory devices, e.g., target vehicle speed, acceleration. This higher quality data benefits sensory devices directly, as distance-to-target information is most likely more accurate from sensory devices. In this configuration, the host vehicle 12 and objects 16 include GPS antennas/devices 26, and V2V communication devices 24, and are able to obtain their position coordinates. The objects 16 are configured to transmit this data along with other pertinent information to the host vehicle 12, where it is preferably stored temporarily and manipulated. Alternatively, the relative positioning and headings of the host vehicle 12 and objects 16 can also be determined by the object detection sub-system 20.

As previously mentioned, pertinent host and target vehicle conditions, such as the absolute positioning, speed, and heading are determinable by the intra-vehicle condition sensor 22, and V2V communication device 24. For example, an onboard digital compass (not shown), speedometer or GPS can be utilized to obtain condition data. Alternatively, the host vehicle and object headings can be calculated at the ECU 18 utilizing present and past position coordinates for each, and the position coordinates of a reference point.

The CPBW module will perform a threat assessment function for any vehicle or object 16 that has been identified as intersecting if the host vehicle 12 is currently traveling in the reverse direction. The threat assessment algorithm is based on a time-to-intersection (TTI) equation that takes into account the predicted paths of the host vehicle 12 and object 16. The predicted rearward trajectory of the host vehicle 12 is the projected straight-line path as determined by GPS position coordinates, and/or sensory information. For example, the speed determinable by a speedometer, the steering wheel angle determinable by a steering wheel angle sensor, the yaw rate and/or wheelbase pitch determinable by a yaw gyro and other relevant sensors can be used to accurately predict the path of the host vehicle 12.

Figure 1B:
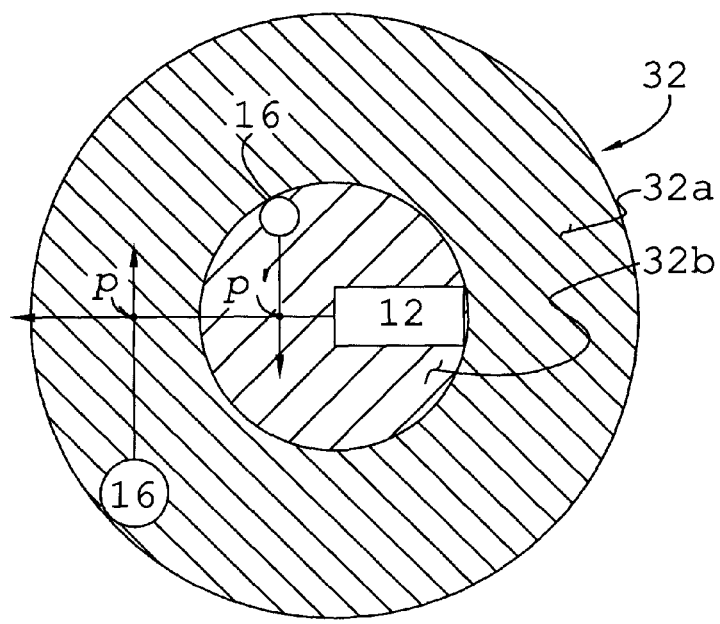
FIG. 1b is a plan view of a host vehicle and a plurality of objects, particularly illustrating projected paths for each, and points of intersection thereof.

As shown in FIG. 1b, once projected paths for the vehicle 12 and objects 16 are determined, a path intersection point, p, is determined. Next, TTI values for the vehicle 12 and each object 16 are computed using their instantaneous speeds, and the distance required to be traveled in order for both 12,16 to reach the intersection point, according to the following algorithm:

$$TTI_A = DTI_A / VSpeed_A$$
$$TTI_B = DTI_B / VSpeed_B$$
if ($TTI_A$ < Gap AND $TTI_B$ < Gap)
Issue Warning Thus, the operator 14 will receive a warning if $TTI_A$ and $TTI_B$ are less than a predetermined maximum period (Gap). In other words, a warning will issue where the host vehicle 12 and object 16 are calculated to transverse the intersection point, p, in less than a maximum allowable reaction time (as defined by the Gap).

Preferably, a Gap setting of 2 seconds is suitable for typical civilian application, with a provision for manually adjusting this setting up or down based on operator preference. The Gap setting, however, may be adjusted, based on, or derived from other vehicle conditions. For example, if the vehicle has an Adaptive Cruise Control (ACC) system, the Gap setting could be derived from ACC parameters.

More preferably, the warning is also not caused to be generated unless the difference between $TTI_A$ and $TTI_B$ is less than a minimum threshold window, wherein the object 16 and vehicle 12 are deemed to meet at the point, p, at generally the same time. A suitable window is preferably autonomously determined by the system 10, and based upon the speed and size of the vehicle 12 and detected objects 16. However, for most typically sized automobiles and encountered speeds, the window may be permanently set to 10 seconds, and more preferably, set to 5 seconds.

2. Vehicle to Vehicle Parking Assistance

A GPS based Vehicle-to-Vehicle Parking Assistance (V2VPA) module warns operators if they are in danger of colliding into another wirelessly equipped object or target vehicle 16 at a low speed. In this configuration, the host vehicle 12 listens to the broadcasts of parked or slow traveling vehicles 16 that are broadcasting at least their current position coordinates, and more preferably, also their gearshift position. If a rearward traveling host vehicle 12 gets too close to another vehicle 16, the operator 14 receives a warning and/or the vehicle automatically brakes. The distance between the vehicles 14,16 is preferably calculated using position, range, azimuth and size information sensed or determined by and communicated between the vehicles 14,16. Similar to cross path backing warning, high quality information from V2V is more preferably used to enhance application performance (e.g., target vehicle speed, steering wheel angle). Where lidar based sensors are utilized, vehicle color is also communicated to assist in determining the expected reflectivity of the object.

The size information preferably consists of distances from the GPS antenna 26 to the front and rear bumpers, $D_1$ and $D_2$, respectively (See, FIG. 1a). Using this information, the positions of the front and rear bumpers of the vehicle are accounted for in the threat assessment calculations. Since it is appreciated that vehicle widths among commonly traveled thoroughfares do not vary widely, an assumed vehicle width may be utilized. If the actual vehicle width is desired, distances from the GPS antenna to the left and right boundaries of the vehicle can be communicated as well.

Thus, in this module, the threat assessment algorithm uses the range, heading and size information in the warning calculations. Vehicles are first classified according to their respective locations and orientations based on their positions, headings and the gearshift position of their gearshift mechanism 28, so that the correct distance compensation values (D-Values) can be determined. For example, as shown in FIG. 1a, the module is further configured to autonomously determine whether $D_1$ or $D_2$ should be factored into a true range determination. The following algorithm can be used to determine the correct D-Values:

```
If (Host-Gear EQUALS Forward)
    Host D-Value = Front
Else
    Host D-Value = Rear
If (Relative-Heading EQUALS Same) {
    If (Host-Gear EQUALS Forward)
        Target D-Value = Rear
    Else
        Target D-Value = Front
}
Else
If (Relative-Heading EQUALS Opposite) {
    If (Target-Gear EQUALS Reverse)
        Target D-Value = Rear
    Else
        Target D-Value = Front
}
Else {
    Target D-Value = Side
}
```

In the above algorithm, a relative heading of "Same" indicates that the relative heading between traveling host and target vehicles 12,16 is less than $Heading_{min}$ degrees and a relative heading of "Intersecting" indicates that the relative heading between the host and target vehicles is more than $Heading_{min}$ degrees and less than $Heading_{max}$ degrees. The following table summarizes the relative headings, gear positions and D-Values for all the possible directions of travel.

| Host/Target Relative Heading | Host Gear | Target Gear | Host D-Value | Target D-Value |
|---|---|---|---|---|
| Same | Forward | Forward | Front | Rear (i.e. $D_2$) |
| Same | Forward | Reverse | Front | Rear |
| Same | Reverse | Forward | Rear | Front (i.e. $D_2$) |
| Same | Reverse | Reverse | Rear | Front |
| Opposite | Forward | Reverse | Front | Rear |
| Opposite | Forward | Forward | Front | Front |
| Opposite | Reverse | Forward | Rear | Front |
| Opposite | Reverse | Reverse | Rear | Rear |
| Intersecting | Forward | Forward/Reverse | Front | Side (assumed width, W/2) |
| Intersecting | Reverse | Forward/Reverse | Rear | Side |

Once the proper D-Values are applied, if the true range to the target vehicle becomes less than a specified threshold, then a warning will be generated, and/or, more preferably, the vehicle will be caused to brake automatically to avoid a collision.

3. Pedestrian/Animal Detection

A Pedestrian Detection Wireless Communication (PDWC) module warns the operator 14 when there is an equipped pedestrian or animal in close proximity, and preferably also when it is in danger of colliding with an equipped pedestrian or animal. Like the V2VPA module, this module listens to the broadcasts emanating from a transponder, or other device, that broadcasts the position coordinates of the object 16 at least periodically. For example, a cellular phone, music player, animal collar, or sub-dermal implant can be configured accordingly. Alternatively, a transponder could be programmed with boundary information, so that if an equipped animal leaves the boundary, the transponder would broadcast warning information to nearby vehicles that there was a non-confined animal in the vicinity.

If the host vehicle 12 is traveling at a low speed and an equipped pedestrian 16 is present within a specified radius of the vehicle 12, the operator 14 receives a caution message indicating that there is a pedestrian nearby. If the vehicle 12 approaches too closely to the equipped pedestrian, a warning will be issued and/or the vehicle will automatically brake. As shown in FIG. 1b, the warning radius 32 is preferably calculated from the front bumper if the vehicle is moving in the forward direction and there is a detected pedestrian ahead; otherwise, the warning radius is calculated from the rear bumper if there is a detected pedestrian behind. The application range of the warning radius is preferably 3 meters, although this value can be adjusted up or down in accordance with local, vehicle condition, or operator preference. It is also within the ambit of the present invention for different alert levels to be correlated with interior regions of the radius, as shown by zones 32a and 32b in FIG. 1b.

4. Infrastructure to Vehicle Local Object Map

Figure 2:
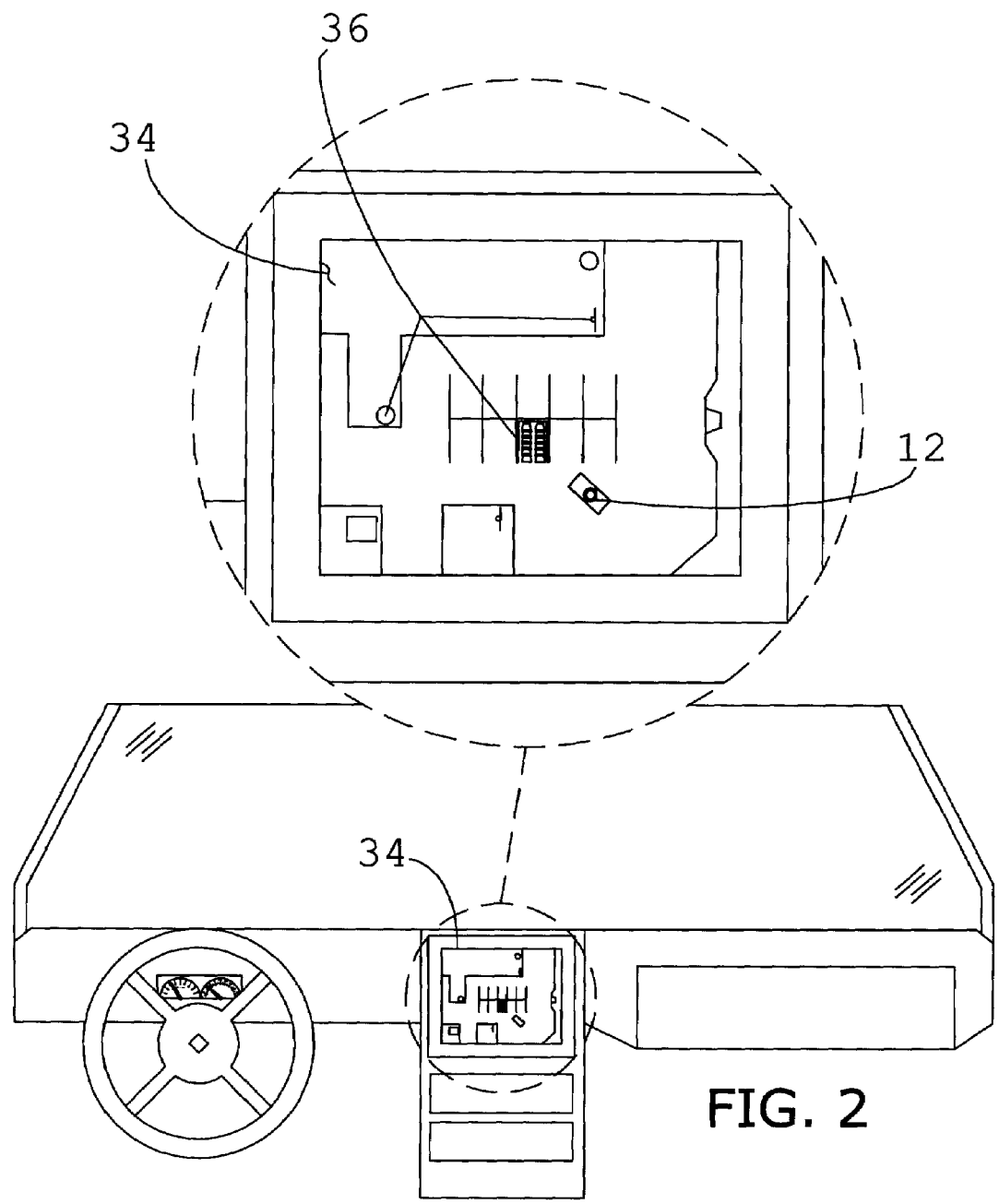
FIG. 2 is an elevation and enlarged view of an dashboard monitor and object map, particularly illustrating infrastructure and appurtenance representation.

Finally, as shown in FIG. 2, an infrastructure/appurtenance-to-vehicle module listens to a roadside unit and/or obtains a local map of stationary objects in the area from an updated service. The object map 34, more preferably, forms part of a retrievable map database (not shown) that can be displayed upon a dashboard monitor, as is traditionally utilized with GPS. The map 34 may be manually requested by the operator 14, or automatically retrieved according to the current position coordinates of the vehicle 12. It is appreciated that local object maps of small regions could be distributed on CD or DVD ROM media.

The object map 34 preferably includes accurate boundary representations of the location of infrastructure and/or appurtenances 36, such as light poles, fire hydrants, shopping cart corrals, gas pumps, guardrails, building structures, trees, and the like. More preferably, the representations may include a factor of safety by expanding the representation boundary 10 cm (as an example) past the actual boundary. These objects 16 may be depicted by polygons that indicate areas that are impassible to vehicles, and displayed to the operator 14 on a dashboard monitor or the like. If the host vehicle 12 becomes too close to an object 16 that has been recorded in the map 34, for example as determined by the closest distance from the vehicle 12 to an edge of the polygon, the operator 14 will receive the warning indication.

The preferred local map is also designed to include the layout of parking spaces. In this configuration, the module warns the operator 14 whenever the host vehicle 12 reverses out of a region that has been defined for parking, or reverses into another parking spot (under the assumption there may be a parked car inside the region).

The threat assessment algorithm at least periodically, and more preferably, continuously monitors the host vehicle 12 position in relation to the local map, and calculates relative distances or ranges therefrom. Where the algorithm determines from a trend in the change in distances that an intersection with a boundary defined by the map will occur, a warning will be issued to the operator 14 and/or the vehicle 12 will automatically brake to avoid colliding with the stationary object.

The preferred forms of the invention described above are to be used as illustration only, and should not be utilized in a limiting sense in interpreting the scope of the present invention. Obvious modifications to the exemplary embodiments and modes of operation, as set forth herein, could be readily made by those skilled in the art without departing from the spirit of the present invention. The inventor hereby state his intent to rely on the Doctrine of Equivalents to determine and assess the reasonably fair scope of the present invention as pertains to any system not materially departing from but outside the literal scope of the invention as set forth in the following claims.

What is claimed is:

1. A collision avoidance system adapted for use with a rearward traveling host vehicle bearing a host vehicle heading, and by an operator, said system comprising:

an object detection sub-system configured to detect at least one condition of each of a plurality of arrear objects each bearing a heading within a heading range based on the host vehicle heading, and generate an input signal, only when the vehicle is traveling in a rearward direction, and an object is detected;

an intra-vehicle condition sensor configured to determine at least one condition of the host vehicle; and at least one electronic control unit communicatively coupled to the sub-system and sensor, and configured to cause to be generated a warning, wherein the warning is perceivable by the operator, when said at least one condition of one of the plurality of arrear objects and at least one condition of the host vehicle cooperatively determine a potential collision, said sensor and sub-system cooperatively including a host vehicle position coordinate locator, and communication device, wherein the locator and communication device are configured to receive position coordinate data from the objects, and transmit the data to the unit, said communication device being communicatively coupled to at least a portion of the objects and unit, said unit being further configured to determine headings for the host vehicle and said at least portion of the objects, compare the object heading ($h_o$) to a heading range defined by the host vehicle heading ($h_{hv}$), and determine an intersecting object when $h_o$ is within the range, said range being defined by heading greater than $h_{hv}+30$ degrees, and less than $h_{hv}+150$ degrees.

2. The system as claimed in claim 1, said unit being further configured to determine a speed for each of said host vehicle and at least portion of the objects, determine a projected path for each of said vehicle and at least portion of the objects based on its speed and heading, determine a separate point of path intersection between the host vehicle and each of said objects within the range, compute a travel time to the point of intersection (TTI) for said host vehicle and object, wherein each TTI is based on the instant speed and the distance between the point of intersection and the current position of the vehicle or object.

3. The system as claimed in claim 2, said unit being further configured to cause the generation of the warning when the difference between TTI's for both the host vehicle and object are within a collision threat window.

4. The system as claimed in claim 2, said unit being further configured to cause the generation of the warning when the TTI for both the host vehicle and object are within a collision threat Gap.

5. The system as claimed in claim 4, wherein said Gap is adjustable according to operator preference, or in accordance with another vehicle condition.

6. The system as claimed in claim 1, wherein at least a portion of the objects periodically broadcast condition information, and said communication device is communicatively coupled to said at least portion of the objects and unit.

7. The system as claimed in claim 6, wherein said objects include equipped pedestrians having a coordinate position data transmitter, and said unit is further configured to generate the warning, when an equipped pedestrian is within a predetermined radius from the host vehicle.

8. The system as claimed in claim 7, wherein the radius is measured alternatively from the front or rear bumper of the host vehicle.

9. The system as claimed in claim 7, said unit being further configured to generate a plurality of differing warnings, wherein each warning correlates to a region within the circle defined by the radius.

10. The system as claimed in claim 9, wherein said objects include remotely parked and traveling vehicles, and the broadcasted condition information includes the coordinate position data, range, heading, azimuth, size information, and gearshift position.

11. The system as claimed in claim 10,
said intra-vehicle sensor and unit being further configured to determine relative positioning between the host and remote vehicles, the host and remote vehicles' gearshift positions, and a true range therebetween based in part on the size information thereof,
said unit being further configured to generate the warning, when the range between the host and remote vehicles becomes less than a predetermined warning threshold.

* * * * *